(12) United States Patent
Fujiki et al.

(10) Patent No.: US 6,433,080 B1
(45) Date of Patent: Aug. 13, 2002

(54) BLOOMING PREVENTING AGENT

(75) Inventors: Tohru Fujiki, Ashiya; Masaaki Tanaka, Toyonaka, both of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/525,009

(22) Filed: Mar. 14, 2000

(30) Foreign Application Priority Data

Mar. 17, 1999 (JP) ............................................. 11-071809

(51) Int. Cl.⁷ ......................... C08L 71/02; C08L 29/04; C08L 21/00
(52) U.S. Cl. .............................. 525/57; 525/58; 525/61; 525/187; 524/376; 524/377; 524/378
(58) Field of Search ................................ 524/376, 377, 524/378; 525/57, 58, 61, 187

(56) References Cited

U.S. PATENT DOCUMENTS

| 5,100,964 A | 3/1992 | Yamamoto et al. |
| 5,424,150 A | * 6/1995 | Ohnishi |
| 5,585,437 A | * 12/1996 | Ohmae |

FOREIGN PATENT DOCUMENTS

| JP | 59-15345 | 4/1984 |

* cited by examiner

*Primary Examiner*—David J. Buttner
(74) *Attorney, Agent, or Firm*—Fitch, Even, Tabin & Flannery

(57) ABSTRACT

A bloom inhibitor which comprises (A) an alkylene oxide adduct of a saponified ethylene-saturated carboxylic acid vinyl ester copolymer, and (B) a polyether compound;

a rubber composition comprising a rubber and the bloom inhibitor; and a vulcanized rubber in which blooming is prevented obtained by vulcanizing the rubber composition are provided.

12 Claims, No Drawings

BLOOMING PREVENTING AGENT

BACKGROUND OF THE INVENTION

The present invention relates to a bloom inhibitor. More precisely, the present invention relates to a bloom inhibitor comprising an alkylene oxide adduct of a saponified ethylene-saturated carboxylic acid vinyl ester copolymer and a polyether compound.

Surface deposition of vulcanization accelerator or the like contained in vulcanized rubbers, so-called phenomenon, occurs during storage of the vulcanized rubbers.

As a measure for inhibiting this phenomenon, a method in which polyethylene glycol is used as a bloom inhibitor has been proposed(JP-B-59-15345). When, however, vulcanized rubbers obtained according to this method were stored for a long period, the phenomenon could not be effectively prevented.

As a bloom inhibitor for resolving this problem, use of an alkylene oxide adduct of a saponified ethylene-saturated carboxylic acid vinyl ester copolymer (hereinafter, referred simply to as the adduct) has been proposed (Japanese Patent No. 2,564,991).

The present inventors have conducted an extensive research for finding a superior bloom inhibitor. As the result, they have found the fact that a bloom inhibitor in which the adduct is combined with a polyether compound exhibits a remarkably superior effect in prevention of the phenomenon and is capable of inhibiting the phenomenon of vulcanized rubbers for a long period. Thus, the present invention has been completed.

SUMMARY OF THE INVENTION

The present invention provides a bloom inhibitor which comprises an alkylene oxide adduct of a saponified ethylene-saturated carboxylic acid vinyl ester copolymer (hereinafter referred to as ingredient (A)), and a polyether compound (hereinafter referred to as ingredient (B)).

DETAILED DESCRIPTION OF THE INVENTION

Examples of the ingredient (A) includes a product which is produced by copolymerizing ethylene and a saturated carboxylic acid vinyl ester, then completely or partially saponifying the obtained copolymer to give a saponification product and subsequently adding an alkylene oxide to said saponification product (JP-A-3-227307).

The method for copolymerizing the ethylene and saturated carboxylic acid vinyl ester is not particularly limited. A conventional method, such as the high-pressure radical polymerization, can be adopted. The saturated carboxylic acid vinyl ester as a raw material for copolymerization is not particularly limited. Preferred examples thereof include vinyl esters of an aliphatic carboxylic acid having about 2 to 4 carbon atoms, such as vinyl acetate, vinyl propionate, vinyl butyrate and a mixture thereof. Amongst them, vinyl acetate is the most preferred. In addition to ethylene and the saturated carboxylic acid vinyl ester, a small amount of α,β-unsaturated carboxylic acid alkyl ester, such as methyl acrylate, ethyl acrylate, butyl acrylate, methyl methacrylate, ethyl methacrylate, butyl methacrylate or a mixture of two or more of them, can be used as another raw material for copolymerization.

The content of ethylene in the ethylene-saturated carboxylic acid vinyl ester copolymer is usually about 1 to 90% by weight and preferably about 40 to 80% by weight. The number average molecular weight of the copolymer is usually about 1,000 to 20,000 and preferably about 1,000 to 10,000.

The method for saponification reaction of the ethylene-saturated carboxylic acid vinyl ester copolymer is again not particularly limited. For example, it may be conducted according to a general manner of a saponification with an alkali in the presence of an alcohol. In addition, other saponification methods such as methods of a heterogeneous liquid system using alcohol. alcoholic solvent system, a pellet dispersion system in alcohol and the like can suitably be adopted depending on characteristic properties varied by the molecular weight of, the content of the saturated carboxylic acid vinyl ester in, or else of the ethylene-saturated carboxylic acid vinyl ester copolymer.

The suitable rate of saponification depends on content of the saturated carboxylic acid vinyl ester in the ethylene-saturated carboxylic acid vinyl ester copolymer and is not particularly limited. Usually, it is about 30 to 100%, preferably about 50 to 100%.

The method for adding an alkylene oxide to the saponified ethylene-saturated carboxylic acid vinyl ester copolymer is not particularly limited. Generally, it is performed by reacting the alkylene oxide in the gaseous phase on said saponified copolymer.

Although the alkylene oxide is not particularly limited, it is preferably a compound having about 2 to 4 carbon atoms such as ethylene oxide, propylene oxide and butylene oxide. Amongst them particularly preferred is ethylene oxide. Two kinds of the alkylene oxide can be used. The addition may be the block addition or the random addition.

Although the amount of addition of the alkylene oxide is not particularly limited, it is usually about 20 to 1,000 parts by weight, preferably about 50 to 500 parts by weight, based on 100 parts by weight of the saponified copolymer.

Examples of the ingredient (B) in the invention include polyether compounds having an ether bond in its main chain. Specific examples include polyethylene glycol, polypropylene glycol, polytetramethylene glycol and polyphenylene ether. Amongst them, polyethylene glycol and polypropylene glycol are preferred and polyethylene glycol is particularly preferred.

The number average molecular weight of the ingredient (B) is usually within a range of about 1,000 to 20,000. The compounds within the range of about 2,000 to 10,000 are preferred. When the number average molecular weight is less than 1,000, the polyether compound is liable to deposit on the surface of rubber. When the number average molecular weight exceeds 20,000, the molecular motion of the polyether compound in the rubber composition is lowered. Therefore, the preventing effect against the phenomenon is liable to be decreased.

The weight ratio of the ingredient (A) and the ingredient (B) is usually about 35:65 to 65:35 and preferably about 40:60 to 60:40.

In addition to the ingredient (A) and the ingredient (B), the bloom inhibitor of the present invention may optionally contain one or more other ingredients such as inorganic filler. Examples of the inorganic filler include silica, talc, clay, calcium carbonate, aluminum hydroxide, aluminum oxide, titanium oxide and carbon black. As the inorganic filler, silica and calcium carbonate are particularly preferred.

The bloom inhibitor of the invention can be produced by mixing the ingredient (A) and the ingredient (B) together with, if necessary, another ingredient such as the inorganic filler.

The rubber composition of the invention comprises a rubber, the ingredient (A) and the ingredient (B). In addition, if necessary, it may further comprise a compounding additive, vulcanizing agent, vulcanization accelerator and the like.

The weight ratio of the ingredients in the rubber composition is usually about 0.1 to 10 parts by weight of the ingredient (A) and about 0.1 to 10 parts by weight of the ingredient (B), based on the 100 parts by weight of the rubber. Above all, about 0.2 to 1 parts by weight of the ingredient (A) and about 0.2 to 1 parts by weight of the ingredient (B) are preferred and, about 0.2 to 0.5 parts by weight of the ingredient (A) and about 0.2 to 0.5 parts by weight of the ingredient (B) are more preferred.

The weight ratio of the ingredient (A) and the ingredient (B) in the rubber composition is usually about 35:65 to 65:35 and preferably about 40:60 to 60:40.

When the weight ratio of the ingredient (A) exceeds 10 parts by weight based on 100 parts by weight of the rubber, the strength of the obtained vulcanized rubber is liable to be lowered. When the ingredient (A) is less than 0.1 part by weight, the preventing effect against the phenomenon of vulcanized rubber is liable to be insufficient.

When the ingredient (B) exceeds 10 parts by weight based on 100 parts by weight of the rubber, the ingredient (B) is liable to deposit from the obtained vulcanized rubber. When the ingredient (B) is less than 0.1 part by weight, the preventing effect against the phenomenon of vulcanized rubber is liable to be insufficient.

As the rubber, natural and synthetic rubbers can be used, with the synthetic rubbers being preferred.

Specific examples of the synthetic rubbers include ethylene-α-olefin copolymer rubber, styrene-butadiene copolymer rubber (SBR), chloroprene rubber (CR), acrylonitrile-butadiene rubber (NBR) and isoprene-isobutylene copolymer rubber (IIR). Particularly preferred is the ethylene-α-olefin copolymer rubber.

The ethylene-α-olefin copolymer rubber includes, for example, copolymer rubbers constituting of ethylene and one or more α-olefins (EPM) and copolymer rubbers constituting of ethylene, one or more α-olefin and one or more unconjugated dienes (EPDM). Examples of the α-olefin include propylene, 1-pentene and 1-hexene. Examples of the unconjugated diene include dicyclopentadiene, ethylidenenorbornene, 1,4-hexadiene, methyltetrahydroindene and methylnorbornene.

Examples of the compounding additive include fillers, stabilizers such as antioxidants and antiozonants, cross-linking agents, retarders, peptizers, processing aids, waxes, oils, stearic acid, tackifiers, methylene doners and methylene acceptor organic cobalt compounds.

Examples of the filler include inorganic fillers described above and other fillers such as coumarone-indene resins, high-styrene resins and phenol resins. Amongst them, inorganic fillers are preferred and silica, talc, calcium carbonate and carbon black are particularly preferred.

Examples of the vulcanization agent include sulfur compounds and organic peroxides. Examples of the sulfur compounds include sulfur, sulfur chloride, sulfur dichloride, morpholine disulfide, alkylphenol disulfide, tetramethylthiuram disulfide and selenium dimethyldithiocarbamate. Amongst them, sulfur is preferred.

Examples of the organic peroxides as the vulcanization agent include dicumyl peroxide, 2,5-dimethyl-2,5-di(tert-butylperoxy)hexane, 2,5-dimethyl-2,5-di(benzoylperoxy) hexane, 2,5-dimethyl-2,5-di(tert-butylperoxy)hexyne-3, di-tert-butylperoxide, di-tert-butylperoxy-3,3,5-trimethylcyclohexane and tert-butylhydroperoxide. Amongst them, dicumyl peroxide, tert-butylperoxide, di-tert-butylperoxide and di-tertbutylperoxy-3,3,5-trimethylcyclohexane are preferred.

When an organic peroxide is used as the vulcanization agent, co-use with a vulcanization aid is preferred. Examples of the vulcanization aid include sulfur, quinone dioxime compounds such as p-quinone dioxime, methacrylate compounds such as polyethyleneglycol dimethacrylate, allyl compounds such as diallyl phthalate and triallyl cyanurate, maleimide compounds such as bismaleimide and divinylbenzene.

When a sulfur compound is used as the vulcanization agent, co-use with a vulcanization accelerator is preferred. Examples of the vulcanization accelerator include thiazol compounds such as N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl) mercaptobenzothiazole, 2-(2,6-diethyl-4-morpholinothio) benzothiazole and dibenzothiazole-benzothiazyl disulfide, guanidine compounds such as diphenyl guanidine, triphenyl guanidine, di-o-tolylguanidine, o-tolylbiguanide and diphenylguanidine phthalate, aldehyde-amines or aldehyde-ammonia compounds such as acetaldehyde-aniline condensate, hexamethylenetetramine and acetaldehyde-ammonia, immidazoline compounds such as 2-mercaptoimmidazoline, thiourea compounds such as thiocarbanilide, diethylthiourea, dibutylthiourea, trimethylthiourea and di-o-tolylthiourea, thiuram compounds such as tetramethylthiuram monosulfide, tetramethylthiuram disulfide, tetraethylthiuram disulfide, tetrabutylthiuram disulfide and dipentamethylenethiuram tetrasulfide, dithio-salt compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate, xanthate compounds such as zinc dibutylxanthate, and zinc oxide.

The rubber composition of the present invention can be obtained, for example, by charging the ingredient (A), the ingredient (B) and, if necessary, any compounding additives in a closed kneader, an oven rolls, an extruder or the like, followed by kneading them. Then, the obtained kneaded product is combined, if necessary, with a vulcanization agent, vulcanization accelerator and the like to give a rubber composition of the present invention.

As the ingredient (A), the ingredient (B) and any compounding additives used if necessary, a premixed compound can be used.

A vulcanized rubber in which blooming is prevented can be obtained by vulcanizing the rubber composition obtained in the above manner, which contains a vulcanization agent and others.

EXAMPLES

The present invention will now be described in more detail by means of Examples, which should not be construed as a limitation upon the scope of the invention.

Reference Example 1
(Preparation of an Ethylene-Vinyl Acetate Copolymer)

Using a high pressure reactor, ethylene and vinyl acetate were copolymerized in the presence of tert-butylperoxy-2- ethyl hexanoate as the polymerization initiator and propane as the molecular weight modifier at a pressure of 1400 kg/cm$^3$ and a temperature of 190° C. to give an ethylene-vinyl acetate copolymer (hereinafter, referred to as EVA) having a vinyl acetate content of 31% by weight, a number average molecular weight of 1,800 and a softening point of 30° C.

(Preparation of an Ethylene Oxide Adduct of Saponified Ethylene-Vinyl Acetate Copolymer)

Into a stainless steel autoclave having a capacity of 700 l equipped with a stirrer, withdrawing line and a feeding line were charged 160 kg of EVA, obtained above, 320 kg of methanol and 0.96 kg of sodium hydroxide. They were reacted with stirring and heating at 65° C. for 2 hours while opening the withdrawing line. Then, the temperature in the system was elevated to 142° C. over 1 hour to expel all the volatile substances. The obtained saponification product was a wax-like substance having a melting point of 83° C. and the saponification rate of 90%.

Subsequently, 0.27 kg of sodium hydroxide was added and the temperature in the system was elevated to 180° C. Then ethylene oxide was introduced to elevate the pressure in the system to 2 kg/cm$^2$. After a pressure drop by the addition reaction of ethylene oxide was confirmed, intermittent feeding of ethylene oxide was subsequently carried out to attain the pressure of 2 kg/cm$^2$ and thus 272 kg of ethylene oxide in total was charged over 1 hour. When the pressure decreased to 0.4 kg/cm$^2$, the temperature was lowered to 100° C. and the product was taken out. Thus, 408 kg of an ethylene oxide adduct of saponified ethylene-vinyl acetate copolymer was obtained. It has a melting point of 51° C. and a hydroxyl value of 110 KOH/g. The adduct obtained above was used as the ingredient (A).

Aliphatic polyether compounds, described below, were used as the ingredient (B).

B-1: polyethylene glycol (average molecular weight: 3,000), "PEG 4000", manufactured by Wako Pure Chemical ID., Ltd.

B-2: polyethylene glycol (average molecular weight: 7,500), "PEG 6000", manufactured by Wako Pure Chemical ID., Ltd.

The following substance was used as the rubber. Ethylene-propylene-ethylidene-norbornene copolymer rubber (EPDM): "Esprene E524" (Mooney viscosity ML1+4 (100° C.): 35), manufactured by Sumitomo Chemical Co., Ltd.

Examples 1–4 and Comparative Examples 1–4

In a Banbury mixer (600 ml laboplastomil, manufactured by Toyo Seiki), after heating an oil bath to 150° C., were charged 100 parts by weight of the rubber (EPDM), 100 parts by weight of carbon black (ShoBlackN-550, manufactured by Showa Cabot), 30 parts by weight of a process oil (a paraffin process oil PW-380, manufactured by Idemitsu Kosan), 1 part by weight of stearic acid, 5 parts by weight of zinc oxide, 3 parts by weight of calcium oxide, the ingredient (A) and the ingredient (B), their amounts in part by weight being shown in Table 1. They were kneaded at 50 rpm for 10 minutes. At this point in time, the temperature of the rubber was 155 to 170° C.

Then, the kneaded mass was transferred to an oven mil. At a roll temperature of 50° C. were added thereto zinc di-n-butyldithiocarbamate (Soxinol BZ, a vulcanization accelerator manufactured by Sumitomo Chemical, Co., Ltd.), tetramethylthiuram disulfide (Sanceler TT, a vulcanization accelerator manufactured by Sanshin Chemical, Co., Ltd.), 0.5 part by weight of dipentamethylenethiuram tetrasulfide (Soxinol TRA, a vulcanization accelerator manufactured by Sumitomo Chemical, Co., Ltd.), 1 part by weight of 2-mercaptobenzothiazole (Soxinol M, a vulcanization accelerator manufactured by Sumitomo Chemical, Co., Ltd.) and 1 part by weight of sulfur. They were kneaded to give a rubber composition.

The composition thus obtained was press-molded at vulcanization conditions of 160° C. for 20 minutes to give a plate (150 mm×150 mm×2 mm thickness) of the vulcanized rubber for observation of blooming.

The observation of blooming was preformed by the following method and the results are shown in Table 1.

The surface of the plate of the vulcanized rubber was observed after 7 days and 14 days from the vulcanization. The results of observation for blooming shown in Table 1 were based on the following criteria:

o: No clouding by blooming was observed.
x: Clouding by blooming was observed.

TABLE 1

| | Example | | | | Comparative Example | | | |
|---|---|---|---|---|---|---|---|---|
| | 1 | 2 | 3 | 4 | 1 | 2 | 3 | 4 |
| Composition (part by weight) | | | | | | | | |
| A | 0.3 | 0.3 | 0.36 | 0.24 | 0 | 0.6 | 0 | 0 |
| B-1 | 0.3 | 0 | 0.24 | 0.36 | 0 | 0 | 0.6 | 1.2 |
| B-2 | 0 | 0.3 | 0 | 0 | 0 | 0 | 0 | 0 |
| Blooming | | | | | | | | |
| After 7 days | ○ | ○ | ○ | ○ | × | × | × | ○ |
| After 14 days | ○ | ○ | — | — | × | × | × | × |

According to the present invention, a bloom inhibitor which can inhibit blooming of vulcanized rubbers for a long period can be provided. In addition, the vulcanized rubber of the present invention can be utilized in the industrial rubber field or the like, such as rubbers for automobile, rubbers for electronic parts and others, making good use of its excellent properties.

What is claimed is:

1. A bloom inhibitor which comprises (A) an alkylene oxide adduct of a saponified ethylene-saturated carboxylic acid vinyl ester copolymer, and (B) at least one member selected from the group consisting of polyethylene glycol and polypropylene glycol, wherein the weight ratio of (A) and (E) is out 35:65 to 65:35.

2. The bloom inhibitor according to claim 1, wherein the number average molecular weight of (B) is within a range of about 1,000 to 20,000.

3. The bloom inhibitor according to claim 1, wherein (A) the amount of addition of the alkylene oxide is about 20 to 1,000 parts by weight based on 100 parts by weight of the saponified ethylene-saturated carboxylic acid vinyl ester copolymer.

4. The bloom inhibitor according to claim 1, wherein the rate of saponification of the ethylene-saturated carboxylic acid vinyl ester copolymer is about 30 to 100%.

5. The bloom inhibitor according to claim 1, wherein the number average molecular weight of the ethylene-saturated carboxylic acid vinyl ester copolymer is about 1,000 to 20,000.

6. The bloom inhibitor according to claim 1, wherein the content of ethylene in the ethylene-saturated carboxylic acid vinyl ester copolymer is about 1 to 90%.

7. The bloom inhibitor according to claim 1, wherein the alkylene oxide is at least one selected from ethylene oxide, propylene oxide and butylenes oxide.

8. A rubber composition which comprises a which comprises a rubber, (A) an alkylene oxide adduct of a saponified ethylene-saturated carboxylic acid vinyl ester copolymer, and (B) a polyether compound wherein the weight ratio of (A) is about 0.1 to 10 parts by weight and the weight ratio of (B) is about 0.1 to 10 parts by weight, based on the 100 parts by weight of the rubber.

9. A vulcanized rubber which is obtained by vulcanizing a rubber composition comprising a rubber, (A) an alkylene oxide adduct of a saponified ethylene-saturated carboxylic acid vinyl ester copolymer, and (B) a polyether compound.

10. A rubber composition which comprises a rubber, (A) an alkylene oxide adduct of a saponified ethylene-saturated carboxylic acid vim ester copolymer, and (B) at least one member selected from the group consisting of polyethylene glycol and polyprlol, wherein the weight ratio of (A) and (13) is about 35:65 to 65:35.

11. The rubber composition according to claim 10, wherein the rubber is a synthetic rubber.

12. The rubber composition according to claim 11, wherein the synthetic rubber is at least one selected from ethylene-α-olefin copolymer rubber, styrene-butadiene copolymer rubber (SBR), chloroprene rubber (CR), acrylonitrile-butadiene rubber (NBR) and isoprene-isobutylene copolymer rubber (IIR).

* * * * *

UNITED STATES PATENT AND TRADEMARK OFFICE
CERTIFICATE OF CORRECTION

PATENT NO. : 6,433,080 B1
DATED : August 13, 2002
INVENTOR(S) : Fujiki et al.

It is certified that error appears in the above-identified patent and that said Letters Patent is hereby corrected as shown below:

Column 7,
Line 4, delete "which comprises a", second occurrence.

Signed and Sealed this

Third Day of February, 2004

JON W. DUDAS
*Acting Director of the United States Patent and Trademark Office*